United States Patent [19]
Colton

[11] Patent Number: 4,686,617
[45] Date of Patent: Aug. 11, 1987

[54] CURRENT LIMITED CONSTANT FREQUENCY DC CONVERTER

[75] Inventor: Robert M. Colton, Philadelphia, Pa.

[73] Assignee: RCA Corporation, Princeton, N.J.

[21] Appl. No.: 871,372

[22] Filed: Jun. 6, 1986

[51] Int. Cl.$^4$ .................... H02H 7/122; H02M 3/335
[52] U.S. Cl. ........................................ 363/56; 363/21; 363/97; 361/93
[58] Field of Search ............... 363/21, 41, 56, 97; 361/18, 86, 93, 100

[56] References Cited

U.S. PATENT DOCUMENTS

| | | | |
|---|---|---|---|
| 4,047,235 | 9/1977 | Davis | 361/100 |
| 4,218,613 | 8/1980 | Bletz | 250/214 A |
| 4,327,268 | 4/1982 | Frank | 219/10.77 |
| 4,524,412 | 6/1985 | Eng | 363/56 |
| 4,586,120 | 4/1986 | Malik et al. | 363/56 X |
| 4,616,301 | 10/1986 | Small | 363/56 X |

OTHER PUBLICATIONS

An article entitled "Modelling and Analysis of Switching DC-to-DC Converts in Constant Frequency Current-Programmed Mode", by HSU et al., published 1979 by IEEE, pp. 248–301.

*Primary Examiner*—Patrick R. Salce
*Assistant Examiner*—Emanuel Todd Voeltz
*Attorney, Agent, or Firm*—Clement A. Berard, Jr.; William H. Meise

[57] ABSTRACT

A constant-current, current-programmed dc-to-dc converter includes a controllable switch and an inductor. The switch is rendered conductive in response to a recurrent clock signal, and nonconductive in response to a comparison of a voltage representing the inductor ramp current with an output voltage error signal from a high impedance source, which establishes an output voltage control feedback loop. An overcurrent limiting circuit includes a current sensor having a low output impedance which produces a load current representative signal. The load current representative signal is applied to an amplifier having a low output impedance and which includes a diode in its feedback loop to maintain it nonsaturated. A second diode is connected to the output of the amplifier and to the high impedance output terminal of the error voltage source to close a current limiting degenerative feedback loop which swamps the error voltage when the second diode becomes conductive due to excess load current. This reduces the peak value of inductor current sufficient to maintain the desired load current limit. If the amplifier fails open-circuit, both diodes conduct to the low impedance current sensor and continue to provide load overcurrent protection.

12 Claims, 11 Drawing Figures

CURRENT LIMITED CONSTANT FREQUENCY DC CONVERTER

The Government has rights in this invention pursuant to Contract No. N00024-81-C-5106 awarded by the Department of the Navy.

This invention relates to direct voltage converters and more particularly to current limiters for dc-to-dc converters of the type which are voltage regulated in a constant-frequency, current-programmed mode.

BACKGROUND OF THE INVENTION

In many applications it is desirable to convert a primary direct voltage to another direct voltage in an efficient manner. This problem often arises in the context of electrical equipment powered by the primary direct voltage electrical system of a vehicle. The primary direct voltage system of the vehicle is often a battery having a relatively low direct voltage, whereas the equipment to be powered may require a higher voltage or a lower voltage. The abbreviation dc (direct current) is often used to denote a direct voltage. Where the equipment to be powered requires a lower voltage at high current, a dc-to-dc converter may be used to avoid unwanted power dissipation in a voltage dropping resistor. Where an output voltage higher than the primary voltage is required, the dc-to-dc converter is desirable.

One way to implement a dc-to-dc converter is to use the primary direct voltage to energize an oscillator, and to drive the primary winding of a transformer with the output of the oscillator. The secondary voltage of the transformer at the appropriate voltage level is rectified and filtered to produce the desired direct voltage. It has been found to be more efficient to apply the primary direct voltage to a switched inductor, either with or without a transformer. In order to minimize the physical sizes of the inductor and the transformer (if used), the switching often occurs at frequencies much higher than the 50 or 60 Hertz (Hz) power line frequency. For example, dc-to-dc converters are often used in television receivers to produce the kinescope ultor direct voltage, and are switched in synchronism with the 15,750 Hz television horizontal deflection.

It is often convenient to incorporate feedback voltage regulation into a switching dc-to-dc converter to compensate for load and other variations. This is ordinarily accomplished by sensing the direct output voltage of the converter, comparing it with a reference voltage to produce an error voltage, and controlling a pulse width modulator (PWM) by means of the error voltage. The pulse width modulator, in turn, establishes the duty cycle or the ratio of the conductive time to the nonconductive time of the converter switch, which in turn establishes the amount of energy stored in the inductor for transfer to the output circuit and therefore determines the output voltage.

Constant-frequency, current-programmed dc-to-dc converters have received attention. In current-programmed converters, the switched reactance is made conductive by a clock signal, and a ramp current increases until the switched reactance is rendered non-conductive by a comparator which compares the ramp current with an error voltage derived from a comparison of the converter output voltage with a reference voltage. These converters have simpler transfer functions than pulse width modulated converters, and are therefore easier to filter for stability and reduced ripple. If the converter load increases, the voltage controlled feedback loop will tend to increase the peak current of the ramp to maintain the output voltage, which may result in destruction of high current components. A current regulation scheme is desirable for operation in conjunction with such current programmed converters.

SUMMARY OF THE INVENTION

A current limited dc-to-dc converter includes an inductor and a triggerable switch coupled with the inductor to form a switchable circuit. The switchable circuit is adapted to be coupled to a source of unregulated voltage for generating an increasing ramp current in the inductor when the switch is conductive and a decreasing ramp current when the switch is nonconductive. A clock is coupled to the switch for recurrently switching the switch into conduction. Thus, the ramp current is recurrently initiated at the clock frequency. A filter is coupled to the switchable circuit for integrating at least the increasing or the decreasing ramp current to generate an output voltage which is adapted for application to a load. A first current sensor is coupled to the switchable circuit for producing a first current sense signal which represents the ramp current. A triggering circuit includes an input terminal coupled to the first current sensor and a second input terminal coupled to receive an error voltage, and also includes an output terminal coupled to the switch. The triggering circuit compares the output first current sense signal with the error voltage and triggers the switch into a nonconductive state when the error voltage and the first current sense signal are equal. An error comparator is coupled to the filter, to a reference voltage source, and to the trigger circuit for comparing the output voltage across the filter with the reference voltage for generating the error voltage, thereby closing a voltage control feedback loop. A second current sensor is coupled for sensing average load current to generate a second current sense signal. A second comparator is coupled to the second current sensor for generating a current control signal when the second current sense signal equals a reference voltage. The current control signal is coupled from the second comparator to the triggerable switch in conjunction with the error voltage for closing a current limiting feedback loop which causes the switch to be rendered nonconductive at an earlier time after being triggered into conduction by the clock than in the absence of the current limiting feedback loop. In a particular embodiment of the invention, the current control signal is superimposed upon and swamps the error voltage.

DETAILED DESCRIPTION OF THE INVENTION

Figure 1:
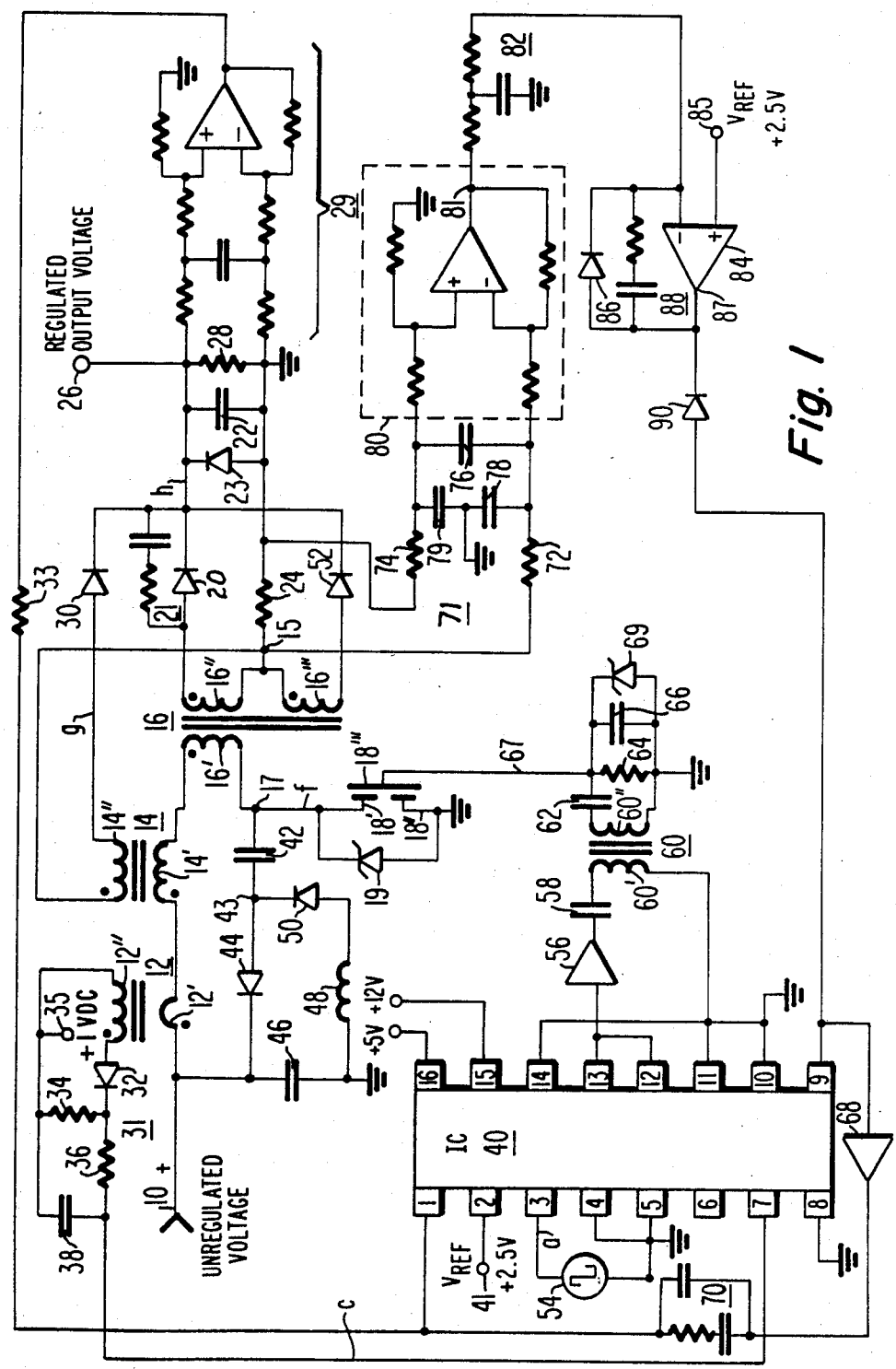
FIG. 1 is a simplified schematic diagram of a dc-to-dc converter according to the invention.

In FIG. 1, current flowing from an unregulated voltage source (not illustrated) and entering input terminal 10 (at upper left of FIG. 1) is filtered by a capacitor 46 and flows, in the order given, through primary winding 12' of a current sensing transformer 12, through an inductive winding 14' of a coupled inductor 14, through the primary winding 16' of a transformer 16, and by way of a node 17, a conductor f, and to ground through the drain (18')-to-source (18") conductive path of a FET transistor switch 18 during those intervals in which switch 18 is conductive. A zener diode 19 is coupled between drain 18' and ground to prevent any possible overvoltage of FET 18.

In order to recover energy, an electrode of a capacitor 42 is connected to node 17, and the other electrode of capacitor 42 is connected by a path including a node 43 and the anode-to-cathode path of a diode 44 to input terminal 10, to form a loop through which currents attributable to stray inductance flow when switch 18 is turned off or rendered nonconductive. Capacitor 42 is discharged during the next following turn-on of switch 18 by the series combination of an inductor 48 and a diode 50 connected between ground and node 43.

During those intervals in which switch 18 is conductive, a progressively increasing (ramp) current flows through windings 12', 14' and 16' to ground due to the inductance of winding 14' of inductor 14. A diode 20 has its anode connected to the dotted end of a secondary winding 16" of tranformer 16. The flow of current through primary winding 16' of transformer 16 induces a voltage in secondary winding 16" which forward-biases diode 20 to produce a flow of current through a conductor h, an output filter capacitor 22, a current sense resistor 24 and a node 15. The current therethrough charges capacitor 22. The resulting voltage across capacitor 22 is applied across a load resistor 28 to a regulated output voltage terminal 26 to which a load (not illustrated) may be connected. A transient suppressing circuit designated 21 is connected across diode 20. A diode 23 having its anode connected to ground and its cathode connected to output terminal 26 provides protection against reverse output voltage. The arrangement of secondary winding 16", diode 20 and filter capacitor 22 constitutes a half-wave rectifier which, as known, tends to draw excessive current due to magnetization of the transformer core. A further secondary winding 16''' of transformer 16 has its dotted end connected at node 15 to winding 16", and its other end connected to the anode of a diode 52. Winding 16''' and diode 52 conduct during those intervals in which secondary winding 16" does not conduct in order to aid in resetting the magnetic core of transformer 16.

The increasing ramp current flow through primary winding 14' when switch transistor 18 is conductive stores energy in the magnetic fields associated with inductor 14. Some voltage may be induced into secondary winding 14", but its polarity is such that serially connected diode 30 is reverse biased and therefore nonconductive.

Figure 2:
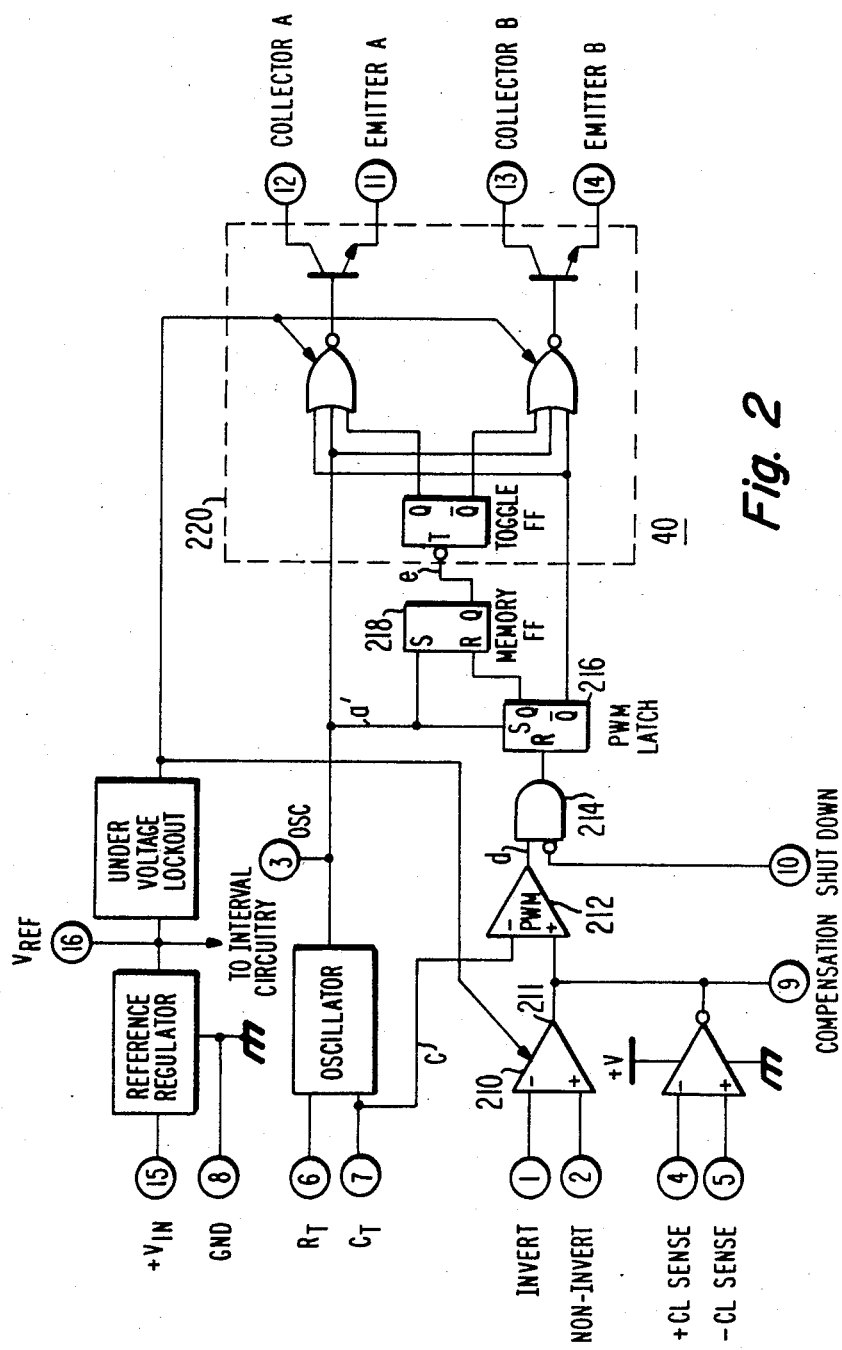
FIG. 2 is a block and schematic diagram of an integrated circuit useful in the arrangement of FIG. 1.

A sample of the output voltage is amplified by a differential amplifier illustrated as 29, and the amplified sample is applied by way of a feedback resistor 33 to pin 1 of an integrated circuit (IC) 40, illustrated in more detail in FIG. 2.

The current flow through windings 12', 14', 16', and through conductor f and switch 18 is sensed by a ramp generator circuit designated generally as 31. Ramp generator 31 includes a diode 32 having its anode connected to the dotted end of secondary winding 12" and its cathode connected by way of a resistor 34 to the other end of secondary winding 12" and to a reference voltage source 35 to which a potential such as +1VDC is applied. During those intervals in which switch 18 is closed or conductive, an increasing current flows from terminal 10 through winding 12', 14', 16', conductor f and switch 18 to ground as energy is stored in the magnetic fields associated with inductor 14. The current flow through primary winding 12' induces a voltage in secondary winding 12" which forward-biases diode 32 and appears as a ramp voltage across resistor 34. The ramp voltage across resistor 34 is superimposed upon the +1 VDC reference voltage at terminal 35 and is applied to a low pass filter including a series resistor 36 and a shunt capacitor 38, and the resulting filtered ramp voltage is applied by way of a conductor c to pin 7 of IC 40. The filtered ramp voltage appearing on conductor c due to the increasing ramp current through primary winding 12' of transformer 12 is illustrated by that portion of waveform 314 of FIG. 3c occurring in the interval T0–T4. Integrated circuit 40 is intended for pulse width modulation type feedback voltage regulation in a switched regulator, but is arranged as described below to operate in a constant-frequency, current programmed mode.

FIG. 2 is a block diagram of a type SG 1524B integrated circuit, manufactured by Silicon General Corporation of 11651 Monarch Street, Garden Grove, Calif. 92641. Integrated circuit 40 is powered by +12 volts applied to pin 15 and ground applied to pin 8. A reference voltage (illustrated as +2.5 volts) is applied from a terminal 41 to pin 2. A +5 volt reference is available from pin 16. Pins 4, 5, 10, 11 and 14 are grounded. A clock signal is applied to pin 3 of IC 40 over a conductor designated a from a clock source 54 (See FIG. 1). Pins 12 and 13, which are the output terminals of IC 40, are connected together and to the input of a switch drive amplifier 56. The output of amplifier 56 is applied by way of a dc blocking capacitor 58 to the primary winding 60' of a switch drive transformer 60 having a secondary winding 60". Voltage produced across secondary winding 60" is ac (alternating current) coupled by a capacitor 62 to the parallel combination of a resistor 64, a capacitor 66, and a dc restoring zener diode 69, and the resulting voltage is applied by way of a conductor 67 to the gate 18''' of FET transistor switch 18. For reasons described below, pin 9 is connected to the input of a buffer amplifier 68, the output of which is applied by way of an AC coupling network designated generally as 70 to pin 1.

As with many integrated circuits, the FIG. 2 block diagram is common to a number of physically identical integrated circuits of various grade or qualities having generally similar type numbers. For example, the type SG 1524B is identical to types SG 2524B and SG 3524B, which are characterized or specified for various differing temperature ranges, and corresponding types with J or N suffixes define plastic or ceramic packages. Thus, the designation of a particular integrated circuit type as useful generally also indicates that the other related types may also be used within their temperature or packaging limits.

Elements illustrated in FIG. 2 are described therein by the names given in the data sheet for the type SG 1524B IC, which are applicable to its use as a pulse width modulator for a switched voltage regulator. These names might not be totally accurate when the circuit is used in the arrangement of FIG. 1. IC 40 as illustrated in FIG. 2 includes a transconductance error amplifier 210, the inverting (−) input terminal of which is connected to pin 1 and the noninverting (+) input terminal of which is connected to pin 2. The signal at high impedance output terminal 211 of transconductance amplifier 210 is applied to pin 9 and to the noninverting input terminal of a comparator 212 (designated as a PWM on the data sheet and in FIG. 2). The inverting input terminal of comparator 212 is connected to pin 7 for receiving filtered ramp voltage from ramp generator 31. The output of comparator 212 is applied by way of a conductor d to an input of an AND gate 214, which is always enabled by virtue of the ground applied to pin 10 of IC 40, and thus is effectively out of the circuit. The output of AND gate 14 is applied to an input of a bistable circuit 216 which is set by clock signals received at its set (S) input from IC terminal 3 by way of a conductor designated a' and reset (R) by the output signal from comparator 212 and AND gate 214. The Q output of bistable 216 is applied to the reset (R) input of a further, flip-flop (FF) 218, the set (S) input of which is connected by way of conductor a' to receive clock signals from input terminal 3. The Q output of FF 218 is applied by way of a conductor e to a logic and drive circuit designated generally as 220 which prevents race conditions to produce drive signals at output terminals 11 through 14.

As so far described, the arrangement of FIGS. 1 and 2 defines a constant frequency, current programmed switched voltage regulator. In operation, a cycle of operation begins at a time illustrated as T0 in FIG. 3a with the application of a clock pulse (illustrated in FIG. 3a as the rising edge of a voltage waveform 310) from clock source 54 to pin 3 of IC 40. The oscillator included in the IC 40 chip and illustrated in FIG. 2 is not used. The rising edge of pulse 310 at time T0 sets the bistable arrangement including FF 216 and FF 218, causing the output of FF 218 on conductor e to make a transition to a high level, as illustrated by 318 of FIG. 3e at time T0. A high level of voltage 318 on conductor e represents a voltage which, when translated to IC terminals 12 and 13 and to the input of amplifier 56, causes transformer 60 to produce a drive voltage which gates switch FET 18 into a conductive condition. With FET 18 conductive, increasing ramp current flows through windings 12',14',16', conductor f and switch 18, as illustrated by current waveform 320 of FIG. 3f in the interval T0-T4. As mentioned, the ramp shape of the current is attributable to the inductance associated with inductor 14. The flow of current through primary winding 16' causes charging of capacitor 22, also as described above.

Error amplifier 210 (FIG. 2) compares the amplified version of the output voltage applied to pin 1 of IC 40 with the reference voltage applied to pin 2 to produce an error voltage at pin 9. The ac gain of amplifier 210 is stabilized by buffer amplifier 68 and feedback network 70 connected between pin 9 and 1. The input impedance of buffer amplifier 68 is made very high so that transconductance amplifier 210 can achieve maximum dc and low-frequency gain. The high-frequency gain of error amplifier 210 is established by the relative impedances of coupling network 70 and feedback resistor 33. The error voltage produced by error amplifier 210 is inversely responsive to the magnitude of the output voltage at output terminal 26. For example, if the output voltage at terminal 26 increases above the set value, the error voltage decreases in magnitude, whereas if the output voltage is too low, the error voltage increases in magnitude. Ordinarily, the error voltage changes very little over a time period as short as several cycles of operation of a switched regulator. A representative magnitude of error voltage is illustrated by dotted line 313 of FIG. 3c.

Figure 3:
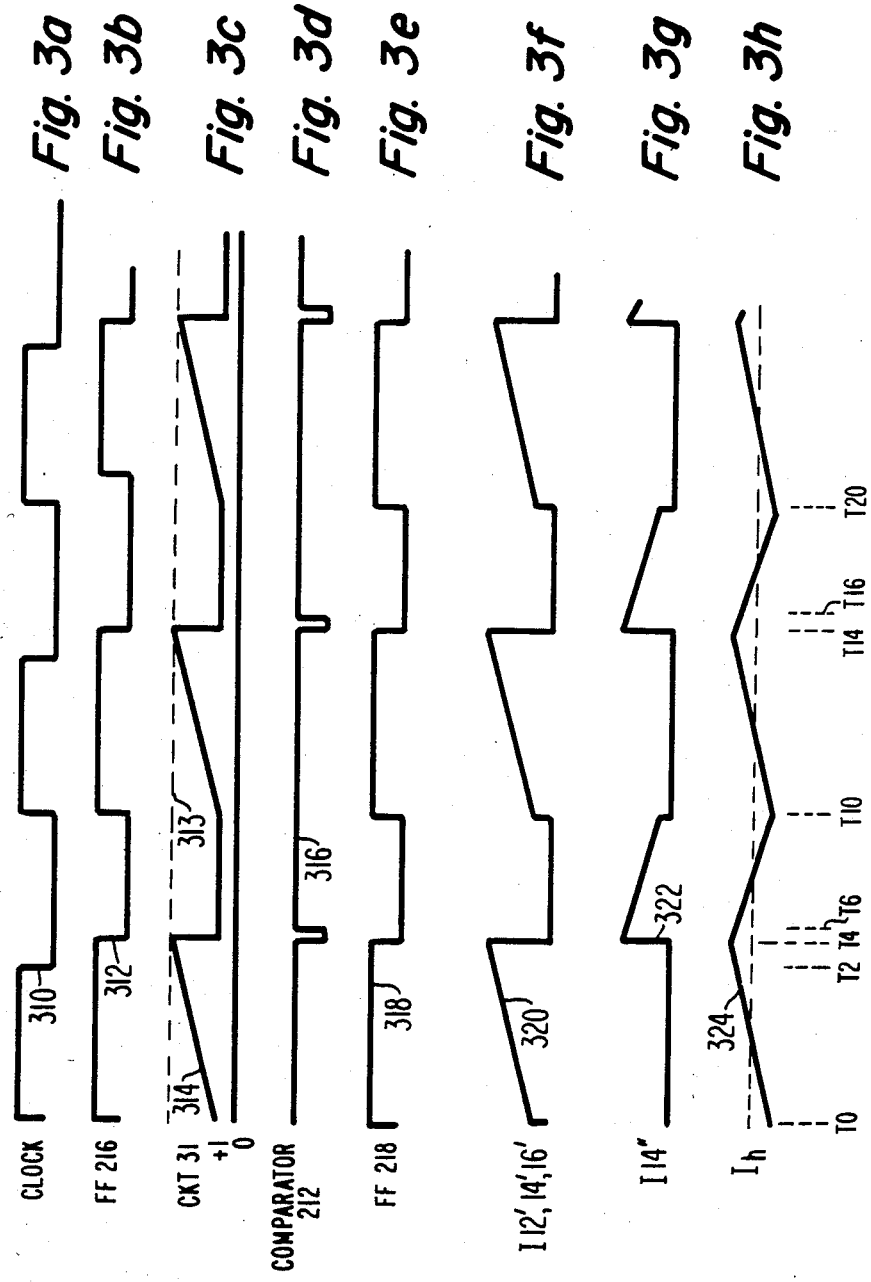
FIGS. 3a–3h are timing diagrams of various voltages and currents occurring in the arrangement of FIG. 1 during operation.

The flow of ramp current through primary winding 12' of transformer 12 also produces on conductor c the filtered ramp voltage illustrated as 314 of FIG. 3c. The ramp component of voltage waveform 314 is responsive to and therefore represents the current ramp through primary winding 12'. Comparator 212 compares ramp voltage 314 arriving via conductor c with the error voltage produced by error amplifier 210. When the magnitude of ramp voltage 314 equals the magnitude of the error voltage 313 at the output of amplifier 210 as illustrated at time T4 in FIG. 3c, the output of comparator 212 switches from a logic high level to a logic low level, as illustrated by voltage waveform 316 of FIG. 3b at time T4. The negative-going transition of waveform 316 is coupled through AND gate 214 to FF 216 and causes it to switch state, as illustrated by waveform 312 of FIG. 3b at time T4. This transition in turn forces FF 218 to switch its state, as illustrated by the transition from a logic high to a logic low level of voltage waveform 318 of FIG. 3e at the time T4. The logic low level on conductor e represents the termination of gate drive to FET transistor switch 18. After time T4, switch 18 remains nonconductive until the next positive-going transition of clock signal 310.

When switch 18 becomes nonconductive at time T4, current flow through windings 12', 14', 16' and conductor f is interrupted, except for some small currents attributable to self-inductance and the like, which flow from node 17 through capacitor 42 and diode 44 in a circular path including windings 12', 14' and 16'. These soon die away, leaving capacitor 42 with a net charge. Current waveform 320 in FIG. 3f is idealized, and does not illustrate the current through winding 12', 14' and 16' which flows through capacitor 42 and diode 44 after time T4. Thus, in the interval between time T4 and the next following time (T10) at which a recurrence of positive-going clock transition occurs, switch 18 remains nonconductive. Additional winding 14" of inductor 14 has its dotted end connected to node 15 and its other end connected by the anode-to-cathode path of a diode 30 to conductor h and to capacitor 22. The energy stored in the magnetic fields associated with inductor 14 induces a voltage in winding 14" which causes current to flow through conductor g and diode 30 to conductor h and capacitor 22 in the interval T4-T10, as illustrated by waveform 22 of FIG. 3g, thus recovering the stored energy. The transition beginning at time T4 also causes a reversal of the voltage induced in secondary winding 12" of transformer 12, which in turn results in a decrease in the ramp component of the filtered ramp voltage on conductor c, as illustrated by the transition of waveform 314 of FIG. 3c at time T4. In the interval T4-T10, the voltage on conductor c is the +1 V dc reference value. The voltage transition on conductor c at time T4, when applied to the inverting input terminal of comparator 212, causes its output voltage on conductor d to make a transition back to a logic high level, as illustrated by the transition of waveform 316 of FIG. 3d at time T6. The transition on conductor d at time T6 has no effect on bistable 216.

After time T6 the energy of inductor 14 continues to be transferred to capacitor 22, and the current flow in winding 14" decreases. This condition continues until the next positive-going transition of clock waveform 310, which occurs at time T10. The cycle as so far described in the interval T0-T10 then repeats in the interval T10-T20.

If the load applied to output terminal 26 increases (a decreasing load resistance) whereby an increasing load current is drawn, and the load voltage across capacitor 22 tends to decrease, the voltage applied to pin 1 also tends to decrease. As mentioned, amplifier 210 will produce a larger error voltage at its output terminal 211, and as a result the increasing ramp voltage applied over conductor c and pin 7 to comparator 212 must increase for a greater length of time before it becomes equal to the error voltage. Thus, a greater time elapses before the transition at time T4 (or time T14, etc.). More energy is stored in inductor 14 during this greater time, and more energy is therefore available for transfer to the load, which tends to correct the output voltage in a degenerative feedback manner. A decrease in the load (increase in load resistance) at output terminal 26 tends to increase the voltage on conductor c, decrease the error voltage, and decrease the interval T0-T4, which results in less energy storage in inductor 14. The decrease in energy storage tends to decrease the output voltage and correct for the decreased loading.

As mentioned, resistor 24 of FIG. 1 is a current sense resistor which senses the current flow through transformer windings 14", 16" and 16''' which is supplied to the load and to capacitor 22. A differential low pass filter designated generally as 71 includes a resistor 72 having one end connected to node 15 and a resistor 74 having one end connected to ground. The other ends of resistors 72 and 74 are connected together by a capacitor 76 and by the series combination of capacitors 78 and 79, the juncture of which is connected to ground. A voltage appears across capacitor 76 which represents the average current through resistor 24. A conditioning amplifier designated generally as 80 is connected across capacitor 76 and amplifies the signal thereacross to produce at its output terminal 81 an amplified signal representative of the average current through resistor 24. Amplifier 80 has a relatively low feed-back gain (for example, a voltage gain of 20, corresponding to 26 dB) and a low output impedance, either inherently or because of the use of degenerative feedback. A low impedance, low pass filter designated generally as 82 is connected to output terminal 81 and to the inverting (−) input terminal of a comparator 84. The noninverting (+) input terminal of comparator 84 is connected to a reference voltage source 85 of value +2.5 volts. Comparator 84 compares the current representative voltage from filter 82 with the +2.5 V reference to produce, in general, one of two states of a bilevel signal at its low impedance output terminal 87. Under normal operating conditions, the current through sense resistor 24 is less than the desired current limit, and therefore the output of amplifier 80 and of filter 82 is less than +2.5 volts. Under normal operating conditions, therefore, the voltage applied to the inverting input of comparator 84 is negative with respect to the reference voltage applied to its noninverting input terminal, and the output voltage of comparator 84 tends toward the maximum voltage which it can produce, which is saturated output (ordinarily the supply bus voltage). As known, an amplifier operated in a saturated condition may not respond quickly to a change in input voltage. This may be extremely disadvantageous for an amplifier in a current limiting feedback loop because the delay occasioned by the time required for the amplifier to come out of saturation may be sufficient to allow destruction of devices through which the excessive current is flowing. However, a diode 86 having its anode connected to output terminal 87 of comparator 84 and its cathode connected to the inverting input terminal causes the output voltage of comparator 84 to limit at a value (+3.2 volts) equal to the reference voltage (+2.5 volts) plus the diode forward potential (0.7 volts for a silicon diode). Diode 86 causes the output voltage of comparator 84 to be limited at a value which is less than the saturated output voltage of amplifier 84. Thus, diode 86 allows comparator 84 to be held out of saturation and to respond quickly when necessary. A series resistor-capacitor combination designated generally as 88 is connected between the inverting input and output of comparator 84 for providing gain-frequency control.

While the output voltage of comparator 84 has been described as bilevel, those skilled in the art will realize that this is a simplification based upon the high gain of the comparator. For a certain range of input values, the output voltage at output terminal 87 is linear and can take on any value between the positive and negative maximum values.

The cathode of a further diode 90 is connected to output terminal 87 of comparator 84, and its anode is connected to pin 9 of IC 40. Diode 90 is normally reverse-biased by the difference between the output voltage (+3.2 volts in the example) of comparator 84 and the error voltage (about +2.5 volts) at output terminal 211 of error amplifier 210. When the current through current sense resistor 24 reaches the limiting value, the output voltage of comparator 84 makes a transition through its linear output region to a large negative voltage, which renders diode 90 conductive to close a degenerative feedback loop which limits the current.

In normal operation, reverse-biased diode 90 does not affect the operation of IC 40 or of the constant-frequency current-programmed voltage-controlled dc-to-dc converter. However, when a current flows through resistor 24 which is in excess of the desired limit current, the output voltage of comparator 84 takes on a negative value which forward-biases diode 90 to couple the negative voltage to pin 9 of IC 40. This superimposes the negative voltage at output terminal 87 of comparator 84 upon the error voltage generated at output terminal 211 of amplifier 210 (FIG. 2). Since the output impedance of amplifier 84 is low, as mentioned, and the output impedance of amplifier 210 is high, the error voltage produced by amplifier 210 is swamped or overwhelmed by the output of comparator 84. This results in the application of a substantial negative voltage to the noninverting input of comparator 212. If the negative voltage is suddenly applied from comparator 84 to pin 9 during an interval such as T0-T4 during which switch transistor 18 is conductive, comparator 212 immediately switches its output terminal and conductor d to a logic low level, thereby terminating the increasing ramp current through windings 12',14' and 16'. A gradually increasing load at output terminal 26, on the other hand, causes the voltage at output terminal 87 of comparator 84 to gradually decrease the error voltage, causing a progressive decrease in output voltage which limits the current as the load is increased.

In the event that comparator 84 becomes inoperative, as for example, by having its output terminal become open circuited, current limiting function continues to be provided. As the load at terminal 26 increases the current through resistor 24 therefore also increases, causing a progressively positive-going output voltage at terminal 81 of amplifier 80. As mentioned, amplifier 80 has a low output impedance at terminal 81, and filter 82 also has a low impedance. As the load increases, the error voltage at the output terminal 211 of error amplifier 210 also increases. The relative increase in error voltage at terminal 211 is greater than the relative increase in voltage at output terminal 81 to amplifier 80, because error amplifier 210 is not fed back at zero frequency, and is therefore at maximum gain, whereas amplifier 80 has a gain of only 20. At some point, the voltage at terminal 81 and at the cathode of diode 86 will become sufficiently negative relative to the error voltage at output terminal 211 of error amplifier 210 to forward-bias diodes 86 and 90, which limits the error voltage at pin 9 of IC 40 and at output 211 of amplifier 210 (FIG. 2). This in turn tends to maintain a constant output current.

Figure 4:
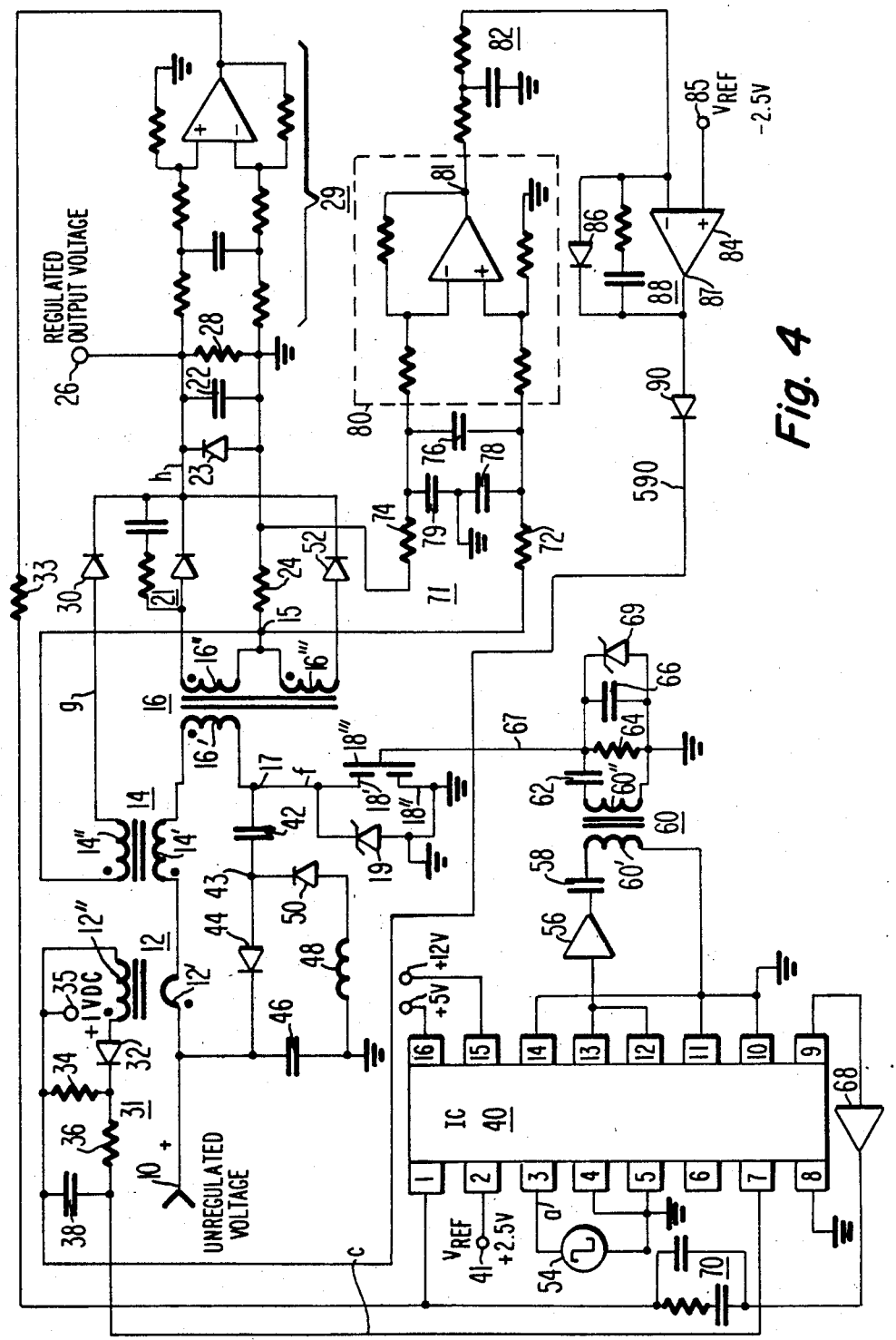
FIG. 4 is a simplified schematic diagram illustrating another embodiment of the invention.

FIG. 4 is a block diagram of a regulator similar to that of FIG. 1 according to another embodiment of the invention. In FIG. 4, elements corresponding to those of FIG. 1 are designated by the same reference numerals. In the arrangement of FIG. 4, amplifier 80 is inverting, the polarities of diodes 86 and 90 are reversed, and diode 90 is connected by a conductor 590 to reference terminal 35 instead of to pin 9 of IC 40. Also, the noninverting input terminal of comparator 84 is connected to a reference voltage of −2.5 volts, rather than +2.5 volts, and +1VDC reference source 35 has a high impedance. During normal operation at output currents less than the desired limiting value, comparator 84 of the arrangement of FIG. 4 has its inverting input terminal positive relative to the −2.5 volt reference applied to its noninverting input terminal. The output voltage of comparator 84 tends toward the negative rail or supply voltage, but is limited and maintained out of saturation by conduction of diode 86. Under normal conditions, therefore, the output voltage of comparator 84 is −3.2 volts (when diode 86 is silicon having 0.7 V junction potential). Diode 90 is therefore reverse biased relative to the +1VDC reference at terminal 35, and has no effect.

When the current limit is approached, amplifier 80 produces an increasingly negative voltage. When the output of amplifier 80 reaches −2.5 volts, the output of comparator 84 becomes positive-going, thereby forward-biasing diode 90. The output voltage of comparator 84 thus swamps the +1VDC reference when the current limit is reached, superimposing a voltage more positive than +1VDC on the ramp component of the filtered ramp voltage (314 of FIG. 3c). This in turn causes ramp 314 to intersect error voltage 313 at a shorter time after time T0, which reduces the energy stored in inductor 14 and available for transfer to the load. This provides degenerative current limiting in a manner generally similar to that of the arrangement of FIG. 1.

Other embodiments of the invention will be apparent to those skilled in that art. In particular, separate inductors may be used for energy storage instead of, or in addition to, the uncoupled inductance transformer-like structure 14 (FIG. 1). The error voltage may have superimposed thereupon a recurrent decreasing ramp voltage for enhancing stability in known manner. The reference voltages may be derived from a common source or may be generated independently. Where peak voltage or power-handling capability require, diodes and/or switch transistors may be paralleled or coupled in series, with the addition, if desired, of appropriate series or parallel resistors for current or voltage sharing stability. Other types of switched power circuits may be used, such as the "buck-boost" type, in which a transformer such as 16 of FIG. 1 is not used, but inductor winding 14′ is directly connected to capacitor 22. The output voltage sample may be coupled directly to the error amplifier or it may be attenuated to accommodate various system impedance levels.

What is claimed is:

1. A current limited constant-frequency current-programmed voltage regulator, comprising:

inductance means;

controllable switch means coupled with said inductance means to form a switchable circuit, said switchable circuit being adapted for connection to a source of unregulated voltage for generating an increasing ramp current through said inductance means during those intervals during which said switch means is conductive and a decreasing ramp current through said inductance means during those intervals during which said switch means is nonconductive;

output capacitance means coupled to said switchasble circuit for being charged by at least one of said increasing and decreasing ramp currents to produce a direct output voltage adapted to be applied to utilization means;

controllable bistable means coupled to said switch means for assuming one of first and second states for controlling the conductive state of said switch means, said first state corresponding to a conductive state of said switch means, and said second state corresponding to a nonconductive state of said switch means;

clock means coupled to said bistable means for recurrently generating clock signal for recurrently triggering said bistable means into said first state, whereby said increasing ramp current recurrently flows through said inductance means;

first current sensing means coupled to said switchable circuit for producing an increasing ramp voltage which is representative of said increasing ramp current and for producing a decreasing ramp voltage representative of said decreasing ramp current;

first comparator means including first and second input terminals, said first input terminal of said first comparator means being coupled to said first current sensing means, said first comparator means also including an output terminal coupled to said bistable means, for comparing said increasing ramp voltage with an error voltage applied to said second input terminal of said first comparator means for generating a switching signal for switching said bistable means to said second state when said increasing ramp voltage equals said error voltage, whereby said increasing ramp current ceases at its peak value and said decreasing ramp current flows through said inductance means until the next recurrence of said clock signal;

a source of first reference voltage;

second comparator means including first and second input terminals and a relatively high impedance output terminal at which said error voltage is generated, said first input terminal of said second comparator means being coupled to said output capacitance means for sensing said output voltage, said second input terminal of said second comparator means being coupled to said source of first reference voltage, and said relatively high impedance output terminal being coupled to said second input terminal of said first comparator means to close a voltage control feedback loop, said second comparator means comparing said output voltage with said first reference voltage for generating said error voltage in a polarity such as to make said feedback loop degenerative, whereby variations in said error voltage resulting from changes in said output voltage cause said peak value of said increasing ramp current to vary in a manner which tends to maintain said output voltage constant;

second current sensing means including current terminals, said current terminals of said second current sensing means being coupled to said output capacitance means for sensing an output current related to said increasing and decreasing ramp currents, for generating an output current representative voltage at low impedance;

a source of second reference voltage representative of the desired output current limit value;

third comparator means including first and second input terminals and a relatively low impedance output terminal, said first input terminal of said third comparator means being coupled to said second current sensing means for receiving said output current representative voltage therefrom, and said second input terminal of said third comparator means being coupled to said source of second reference voltage, for comparing said output current representative voltage with said second reference voltage for generating a substantially bilevel current limit control voltage at said output terminal of said third comparator means, said bilevel current limit control voltage making a transition when said output current representative voltage exceeds said second reference voltage;

first unidirectional current conducting means coupled to said first input terminal of said third comparator means and to said relatively low impedance output terminal of said third comparator means for limiting the excursion in that polarity of said bilevel current limit control voltage occurring when said output current is less than said desired output current limit value, whereby said third comparator means is held out of saturation during normal operation;

second unidirectional current conducting means coupled to said relatively high impedance outut terminal of said second comparator means and to said relatively low impedance output terminal of said third comparator means for closing an output current limiting degenerative feedback loop for overriding said error voltage at said relatively high impedance output terminal of said second comparator means with the signal from said relatively low impedance output terminal of said third comparator means thereby reducing said error voltage when said output current reaches said desired outut current limit value, whereby said peak value of said increasing ramp current is reduced when said output current reaches said current limit value thereby limiting said output current in the region of said output current limit value, and whereby a failure of said third comparator means which increases its output impedance does not necesarily result in total failure to limit current because said first and second unidirectional current conducting means are rendered conductive at an output current somewhat exceeding said desired output current limit value to couple said relatively high impedance output terminal of said second comparator means with said relatively low impedance of said second current sensing means whereby said error voltage produced by said relatively high impedance output terminal of said second comparator means is overridden and reduced by said output current representative voltage from said relatively lower impedance of said second current sensing means.

2. A regulator according to claim 1 wherein said first and second unidirectional current conucting means are diodes.

3. A regulator according to claim 1 wherein said controllable bistable means, said first and second comparator means are formed within the same monolithic integrated circuit.

4. A regulator according to claim 1 wherein said monolithic integrated circuit is a type SG 1524B manufactured by Silicon General.

5. A regulator according to claim 1 further comprising the series combination of a resistance means and capacitance means coupled across said first unidirectional current conducting means.

6. A regulator according to claim 1 wherein said second current sensing means comprises:
sense resistance means coupled between said current terminals of said second current sensing means for generating an unprocessed current sense voltage in response to current flow between said current terminals of said second current sensing means.

7. A regulator according to claim 6 wherein said current terminals of said second current sensing means are coupled in a conductive charging path of said output capacitance means whereby said unprocessed current sense voltage is the product of said output current multiplied by the resistance value of said sense resistance means.

8. A regulator according to claim 7 wherein said second current sensing means further comprises:
differential amplifying means including a pair of input terminals and an output terminal;
low-pass filter means coupled to said sense resistance means and to said pair of input terminals of said differential amplifying means for filtering said unprocessed current sense voltage to generate a filtered sense voltage and for applying said filtered sense voltage to said pair of input terminals of said differential amplifying means;
feedback means coupled to said differential amplifying means for degeneratively controlling the gain of said differential amplifying means and reducing its output impedance; and
further low-pass filter means coupled to said output terminal of said differential means and to said first input terminal of said third comparator means, said further low-pass filter means having a relatively low impedance whereby the sum of the impedance of said further low-pass filter means and the degeneratively reduced output impedance at said output terminal of said differential amplifying means is said relatively low impedance.

9. A regulator according to claim 1 wherein said first current sensing means comprises:

a transformer including a primary winding and a secondary winding, said primary winding being coupled to said switchable circuit for producing a bipolar signal representative of said increasing and decreasing ramp currents across said secondary winding;

unidirectional current conducting means serially coupled with said secondary winding for limiting current flow in said secondary winding in one direction to form a unipolar signal from said bipolar signal; and low pass filter means coupled to said unidirectional current conducting means for filtering said unipolar signal to form said increasing ramp voltage.

10. A regulator according to claim 9 wherein said low pass filter means comprises a series resistor and a shunt capacitor.

11. A current limited dc-to-dc converter, comprising:
inductance means;

triggerable switch means coupled with said inductance means to form a switchable circuit, said switchable circuit being adapted to be coupled to a source of unregulated voltage for generating in said inductance means an increasing ramp current during those intervals in which said switch means is conductive and a decreasing ramp current during those intervals in which said switch means is nonconductive; for clock means coupled to said switch means recurrently triggering said switch means into conduction for recurrently initiating said ramp current;

filter means coupled to said switchable circuit for being charged by at least one of said increasing and decreasing ramp currents to form an output voltage adapted for application to a load;

first current sensing means coupled to said switchable circuit for producing a first current sense signal representative of said ramp current;

triggering means including a first input terminal coupled to said first current sensing means, a second input terminal coupled to receive an error voltage, and an output terminal coupled to said switch means, for comparing said output voltate with said error voltage for triggering said switch means into a nonconductive state when said error voltage and said first current sense signal are equal;

a source of first reference voltage;

error comparison means coupled to said filter means, to said source of first reference voltage, and to said triggering means for comparing said output voltage with said reference voltage for generating said error voltage, thereby closing a voltage control feedback loop;

second current sensing means coupled to said filter means for sensing the average load current and for generating a second current sense signal;

a second source of reference voltage; and second comparison means coupled to said second current sensing means, to said second source of reference voltage and to said triggerable switch means for generating a current control signal when said second current sense signal equals said second reference voltage, and for applying said current control signal to said triggerable switch means in conjunction with said error voltage for closing a current limiting feedback loop which causes said triggerable switch means to be rendered nonconductive.

12. A converter according to claim 11, wherein said current control signal is a voltage which swamps said error voltage.

* * * * *